UNITED STATES PATENT OFFICE.

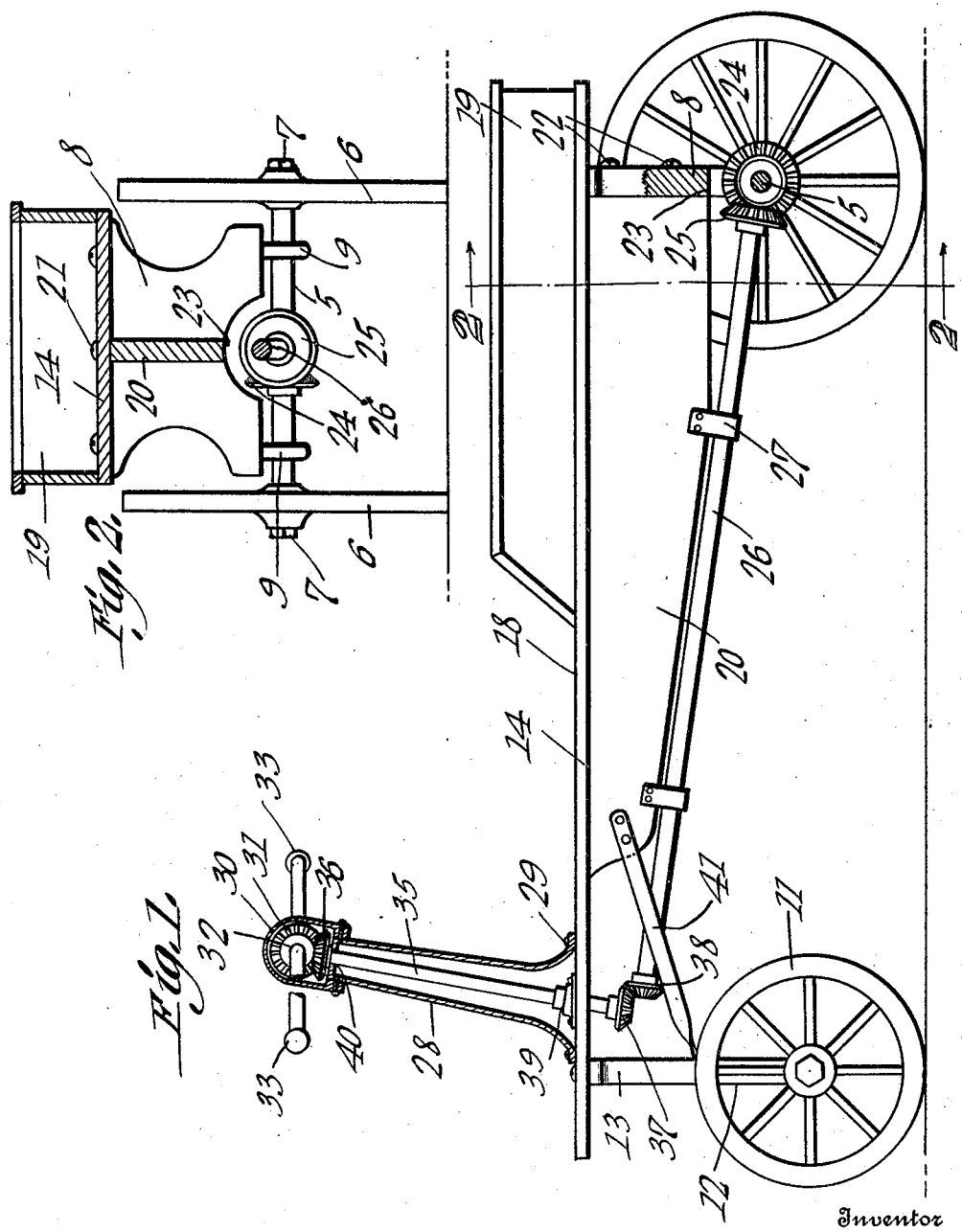

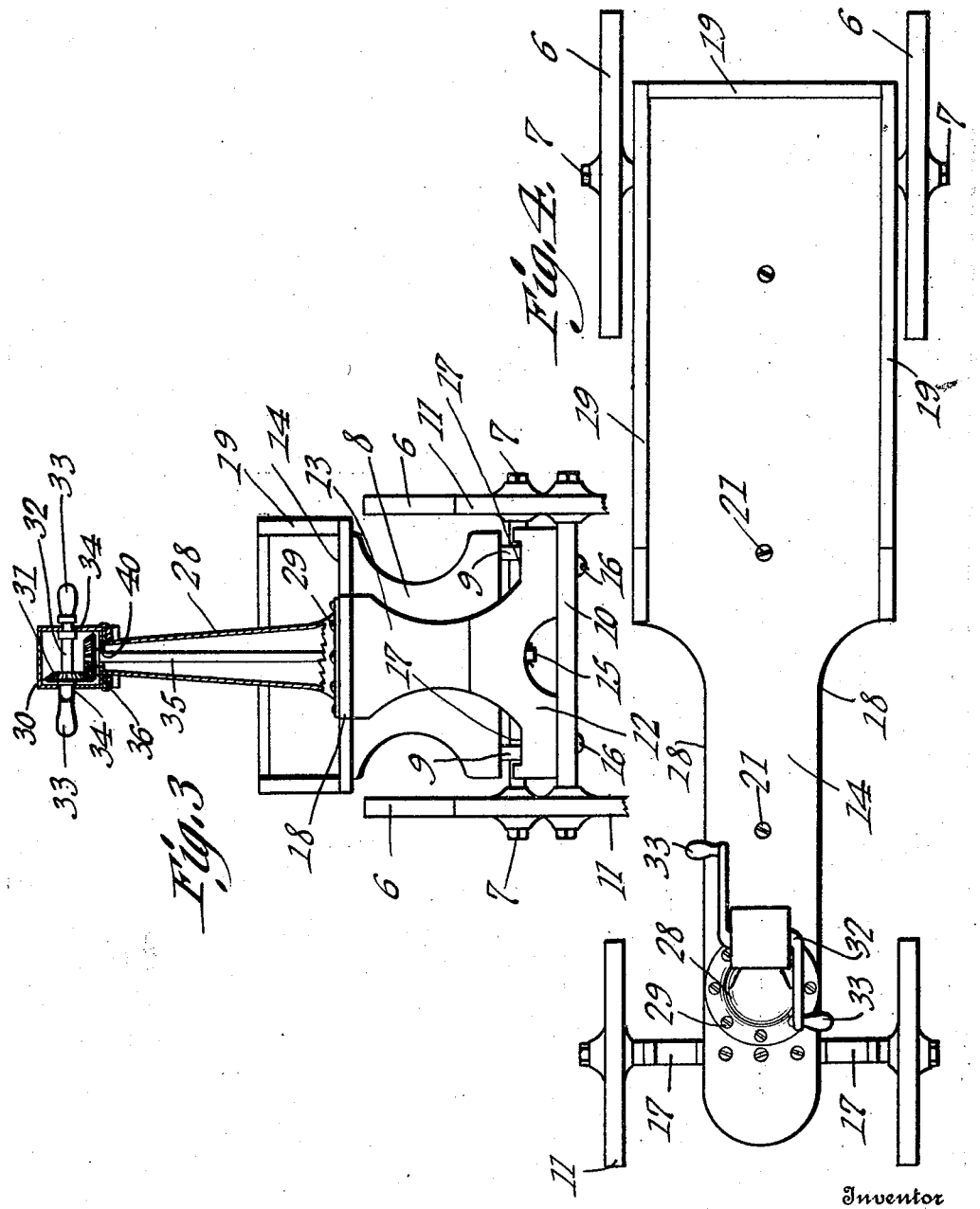

EARL THORN, OF CLEARFIELD, PENNSYLVANIA.

MANUALLY-PROPELLED WAGON.

1,341,725.  Specification of Letters Patent.  Patented June 1, 1920.

Application filed November 5, 1919. Serial No. 335,850.

*To all whom it may concern:*

Be it known that I, EARL THORN, a citizen of the United States, residing at Clearfield, in the county of Clearfield and State of Pennsylvania, have invented a new and useful Manually-Propelled Wagon, of which the following is a specification.

This invention has reference to toy wagons, and more particularly to manually propelled wagons, having means to permit the same to be operated by a person occupying the seat thereof.

The primary object of the invention is to provide operating levers, having connection with the rear wheels of the wagon, whereby movement of the operating levers produces a relative movement of the rear wheels, to move the vehicle over the ground surface, on which the same is supported.

A further object of the invention is to provide means for supporting the operating levers, in a position adjacent the seat of the operator, whereby the operator will have unrestricted use of his arms to manipulate the operating levers.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view, of the wagon constructed in accordance with the present invention, one of the rear wheels thereof being removed.

Fig. 2 illustrates a section on line 2—2 of Fig. 1.

Fig. 3 illustrates a front elevation of the same, and

Fig. 4 illustrates a top plan view.

Referring to the drawings in detail, the reference character 5 designates the supporting axle of the wagon, on which is mounted to rotate therewith, the rear wheels 6, which wheels are prevented from displacement with relation to the axle 5, by means of the nut 7 positioned on the respective ends of the axle.

A bracket 8, has its lower edge secured to the supporting axle 5, by means of the securing elements 9, which as shown are in the form of U bolts, having their upper ends embedded within the bracket 8, the securing elements 9 providing bearings for the axle 5, to permit the axle 5 to have free rotary movement therein.

The front axle 10, supports the front wheels 11, which are free to revolve on said axle 10, the axle also supporting a bracket member 12, which coöperates with the depending bracket member 13, which has connection with the body 14, of the wagon proper.

The coöperating members 12 and 13, are connected by the king pin 15, whereby pivotal movement of one bracket member with relation to the other is permitted, thereby enabling an operator to accomplish the guiding of the wagon from his position thereon.

This bracket member 12, is bolted to the axle 10, by the bolts 16, the upper portions of the member being cut away as at 17, to provide foot rests, to accommodate the feet of the operator for accomplishing the guiding result, it being apparent that movement of the operator's feet in one direction or the other, will cause a relative movement of the front axle 10.

The body of the wagon is relatively long, and provided with a cut out portion 18, to accommodate the legs of the operator, the rear portion thereof is shown as relatively wide and provided with the usual side and end flanges 19, to prevent articles supported on the body 14 from moving therefrom, when the wagon encounters irregularities on the surface over which the wagon is moving.

A depending supporting member 20, extends substantially the entire length of the body, the same being secured to the under side thereof by the bolts 21, passing through the body and entering the supporting member 20, the rear end of said supporting member 20 engaging the bracket 8, and having connection therewith through the medium of the bolts 22.

Disposed substantially centrally of the bracket 8, and formed in the lower edge thereof, is a semi-circular cut out portion 23, which cut out portion provides a clearance for the beveled pinion 24, supported to move with the axle 5, which beveled pinion meshes with the beveled pinion 25, keyed or otherwise secured to the power shaft 26, the same being supported by the supporting member 20, through the medium of the bracket members 27, forming bearings to receive the power shaft 26, the bracket members 27 having connection with the supporting member 20, adjacent the upper edges of the bracket members.

Supported on the body 14 of the wagon, adjacent the forward end thereof, is a tubular housing 28, which housing has connection with the body, by means of the bolts 29 passing through registering openings in the housing 28 and body 14, the upper portion of said housing including a hollow head 30, in which is supported the beveled pinion 31 mounted on the shaft 32, which shaft is formed integral with the operating handles 33, the shaft of course operating in suitable bearings 34, formed in the head 30.

A shaft 35, is mounted in the housing 28, and is disposed in a vertical plane, the upper end thereof having the beveled pinion 36, mounted to move therewith, the beveled pinion 36 being in mesh with the beveled pinion 31 to receive rotary movement therefrom to cause a rotary movement of the shaft 35, the lower end of which shaft 35 terminates at a point in close proximity with the forward end of the power shaft 26, and carries the beveled pinion 37, which is in mesh with the beveled pinion 38, supported on the forward end of the power shaft 26. Suitable bearing members 39 and 40 are provided in the housing for permitting a free rotary movement of the shaft 35 to enable the wagon to be propelled with a minimum amount of exertion.

Brace members 41, connect the supporting member 20 with the bracket 12, and support the front wheels of the wagon in proper relation with the wagon, to prevent the front wheels from moving rearwardly, when the same encounter enlargements in the road surface, over which the same is moving.

While I have shown and described the operated mechanism as employed in connection with a wagon, it is to be understood that by reducing the length of the body 14, and moving the rear wheels forward, the device may be efficiently employed in connection with a kiddie car construction.

From the foregoing it will be seen that in operation, an operator is seated on the wagon 14, his feet taking a position on the front axle 10, or rather in the feet supports 17, the hands of the operator now being in proper relation with the housing 28, to properly grasp the operating handles 33, to move the operating handles, which in turn imparts rotary movement to the rear wheels of the wagon, through the shaft 35 and power shaft 26, the guiding of the wagon being accomplished by the operator moving his feet to cause a relative movement of the front axle 10.

Having thus described the invention, what is claimed is:

In a wagon, a body having a relatively narrow forward portion, rear wheels for supporting the rear portion of the body, pivoted front wheels having connection with the relatively narrow portion, a depending supporting member under the body, a power shaft secured to the supporting member and having connection with the rear wheels, a housing supported on the body, a vertical shaft disposed within the housing and having connection with the power shaft, a pinion on the upper end of the vertical shaft, a hollow head formed on the upper end of the housing, a pinion operating within the hollow head and coöperating with the pinion on the upper end of the vertical shaft, and operating handles having connection with the second mentioned pinion for transmitting rotary motion thereto.

In testimony that I claim the foregoing as my own, I have hereto affixed my signature in the presence of two witnesses.

EARL THORN.

Witnesses:
DANIEL M. RHINESMITH,
GRANT M. McKELVEY.